US007245087B2

(12) United States Patent
Nishikawa et al.

(10) Patent No.: US 7,245,087 B2
(45) Date of Patent: Jul. 17, 2007

(54) POWER CONVERSION DEVICE

(75) Inventors: Yukihiro Nishikawa, Tokyo (JP);
Kesanobu Kuwabara, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 0 days.

(21) Appl. No.: 11/258,390

(22) Filed: Oct. 25, 2005

(65) Prior Publication Data
US 2006/0119281 A1    Jun. 8, 2006

(30) Foreign Application Priority Data
Oct. 26, 2004    (JP)    ............................. 2004-310791

(51) Int. Cl.
*H05B 37/02*    (2006.01)
(52) U.S. Cl. .................... 315/224; 315/276; 363/21.01
(58) Field of Classification Search ................ 315/224, 315/246, 209 R, 276, 291, 307, 317; 363/21.01, 363/21.02, 19; 219/10.55 R
See application file for complete search history.

(56) References Cited

U.S. PATENT DOCUMENTS

| 5,124,518 | A  | * | 6/1992  | Lee .............................. 219/718 |
| 5,995,385 | A  |   | 11/1999 | Shimamura ............... 363/21.16 |
| 6,184,631 | B1 | * | 2/2001  | Noma et al. ................. 315/224 |
| 6,201,713 | B1 |   | 3/2001  | Hosotani ...................... 363/19 |
| 6,687,137 | B1 | * | 2/2004  | Yasumura ................ 363/21.01 |
| 6,836,078 | B2 | * | 12/2004 | Matsumoto ................. 315/224 |
| 6,975,521 | B1 | * | 12/2005 | Konno ..................... 363/21.08 |

FOREIGN PATENT DOCUMENTS

| JP | 11-285248  A | 10/1999 |
| JP | 3387456    B2 | 1/2003 |

* cited by examiner

*Primary Examiner*—Douglas W. Owens
*Assistant Examiner*—Jimmy Vu
(74) *Attorney, Agent, or Firm*—Rossi, Kimms & McDowell, LLP

(57) ABSTRACT

A power conversion device has a series circuit of a main switching element and a sub-switching element connected to both ends of a DC power supply, an insulating transformer, and control circuits. The main switching and sub-switching elements are alternately turned on and off by the respective control circuits such that voltage generated in the secondary coil is subjected to smoothing rectification and supplied to a load. The insulating transformer includes a primary coil, and the main control circuit takes voltage of the primary coil as signal voltage to cause the main switching element to turn on and off such that DC voltage supplied to the load is constant. The sub-control circuit turns on the sub-switching element when the voltage at both ends of the sub-switching element becomes lower than a reference voltage or when the voltage of the primary coil exceeds a predetermined value. The power supply voltage of the main control circuit is taken as a voltage obtained by subjecting the voltage of the coil to smoothing rectification, and the power supply voltage of the sub-control circuit is obtained by the on operation of the main switching element.

12 Claims, 11 Drawing Sheets

7: Load
8: Voltage Detection Circuit
9: Starting Circuit
12: Voltage Lowering Control Circuit
14: Main Control Circuit
16: Sub-Control Circuit 7: Load
8: Voltage Detection Circuit
9: Starting Circuit
12: Voltage Lowering Control Circuit
14: Main Control Circuit
16: Sub-Control Circuit TO POSITIVE ELECTODE
FOR DC POWER SUPPLY 1
Fig. 2
TO DIODE 15
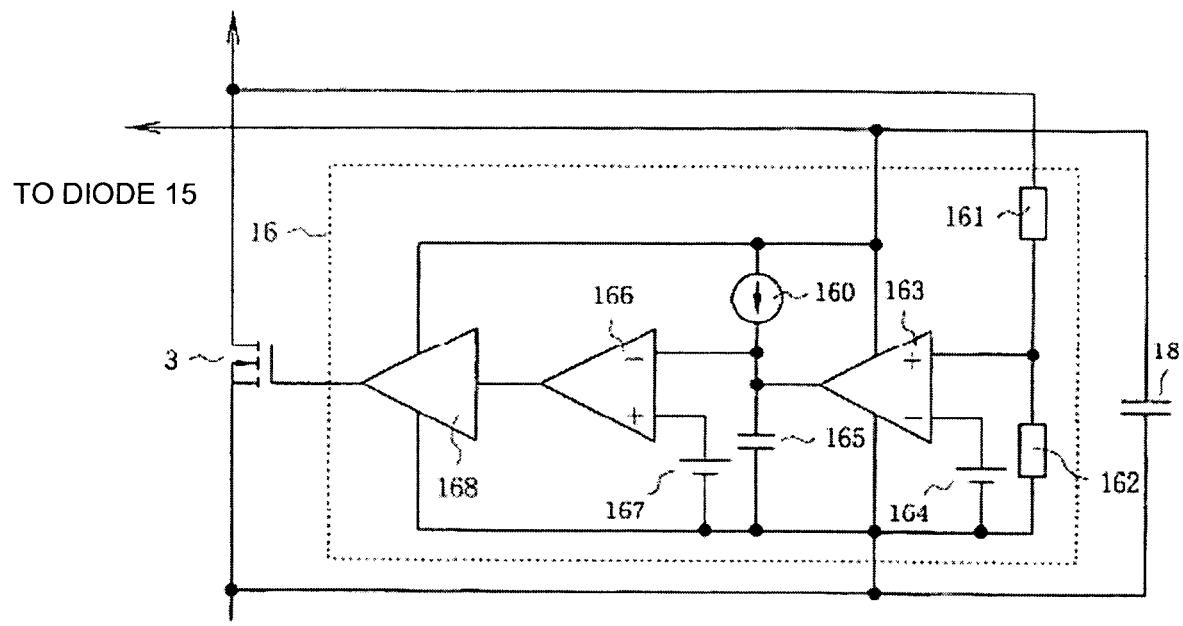
163, 166: Comparator
168: Gate Driver
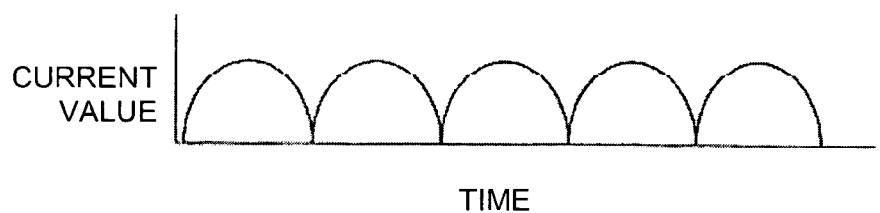
Fig. 3

POWER CONVERSION DEVICE

BACKGROUND

FIG. 13 shows a conventional power conversion device similar to the switching power supply device described in Japanese Patent No. 3387456 (see paragraphs 24–37 and FIGS. 1–2 thereof). This circuit incorporates a "flyback converter," where a main switching element 2 and a sub-switching element 3 are repeatedly turned on and off alternately. The excitation energy accumulates in an insulating transformer 4 when the main switching element 2 is in the on-state and discharges when the main switching element 2 is in the off-state to supply DC power to a load.

A DC power supply 1 is obtained by subjecting the AC power supply voltage to smoothing rectification. The main switching element 2 and the sub-switching element 3 can be MOSFETs or the like. The insulating transformer 4 has coils 4a–4e. The elements 5a and 5b are diodes, and elements 6 and 10 are capacitors. A main control circuit 30 controls the main switching element 2 to turn on and off, to keep the value of an input output voltage of the device (voltage of the capacitor 6) constant. A sub-control circuit 40 controls the sub-switching element 3 to turn on and off using opposite logic of the control of the main switching element 2. The sub-control circuit 40 comprises the coil 4e of the transformer 4, capacitors 41, 45, resistors 42, 44, a bead 43 as a type of inductor, and a transistor 46. Each end of the capacitors 41, 45 is connected to both ends of the coil 4e.

This conventional technology operates as follows. During the start-up process, a voltage is applied to the gate of the main switching element 2 via a resistor (not shown) for star-up inside the main control circuit 30 to turn on the main switching element 2. Turning on the main switching element 2 generates a voltage of the same polarity in the coils 4a and 4d of the transformer, and the excitation energy is accumulated within the coil 4a. At the same time, the voltage generated in the coil 4c is subjected to smoothing rectification by the diode 5b and the smoothing capacitor 6, and then supplied to a load. When the main control circuit 30 turns off the main switching element 2, the excitation energy accumulated within the coil 4a is discharged as electrical energy via the coil 4b, and is subjected to smoothing rectification by the diode 5a and the smoothing capacitor 6, and then supplied to a load. When the whole exciting energy accumulated within the coil 4a is discharged via the coil 4b, a voltage of the same polarity as the voltage generated during the start-up process is generated in the coil 4d, and the main switching element 2 is turned off by the main control circuit 30. In this manner, the electrical energy is supplied to a load in accordance with the on-off operation of the main switching element 2.

The operation of the sub-switching element 3 follows. As the main switching element 2 is turned off, a voltage of a polarity opposite to that generated when the main switching element 2 is in the on-state is generated in the coil 4e within the sub-control circuit 40. This voltage is applied to the gate of the sub-switching element 3 via the capacitor 41, the resistor 42, and the bead 43 to turn on the sub-switching element 3. Accordingly, the capacitor 10 absorbs the energy accumulated in leakage inductance of the transformer 4, and prevents a surge voltage from applying to the main switching element 2. Furthermore, the leakage inductance of the transformer 4 and the capacitor 10 resonate serially, discharging the energy absorbed by the capacitor 10 to the load via the transformer 4, the diode 5a, and the smoothing capacitor 6.

The voltage generated in the coil 4e is applied to a series circuit of the resistor 44 and the capacitor 45 configuring a time-constant circuit, and the capacitor 45 is charged. When the voltage of the capacitor 45 reaches a threshold voltage of the transistor 46, the transistor 46 is turned on. Upon turning on the transistor 46, there is no longer the difference in potential between the gate and the source of the sub-switching element 3, the voltage applied to the gate of the sub-switching element 3 disappears from the coil 4e, and the sub-switching element 3 is turned on rapidly. Here, the time between when the voltage is generated in the coil 4e and when the voltage of the capacitor 45 reaches the threshold voltage of the transistor 46 is the time constant of the time-constant circuit made up of the resistor 44 and the capacitor 45. FIG. 14 shows a frame format of a waveform of current passing through the diode 5a in the conventional technology shown in FIG. 13.

FIG. 15 shows another conventional technology, similar to the switching power supply device described in Japanese Patent Application Laid-Open No. H11-285248 (see paragraphs 34–47 and FIGS. 1 and 3 thereof).

In FIG. 15, the transformer 4' has only coils 4a, 4b, and 4e. The sub-control circuit 60 comprises the coil 4e, resistors 61, 63, a capacitor 62, a diode 64, a transistor 65, and a Zener diode 66. A cathode of the Zener diode 66 is connected to the gate of the sub-switching element 3. Moreover, it includes a diode bridge 50 for obtaining a DC power supply from an AC power supply via a smoothing capacitor 11. It should be noted that the control circuit (main control circuit) of the main switching element 2 is omitted from the figure.

The operation of this conventional technology is described with reference to FIG. 16. In FIG. 16, $I_{D2}$ is the drain current of main switching element 2, $V_{DS2}$ is drain-source voltage of the main switching element 2. $V_a$ is voltage of the coil 4e of the transformer 4', and its polarity is such that the positive electrode is in the direction in which voltage is generated from the beginning of winding to the end of winding. $V_{GS3}$ is the gate-source voltage of the sub-switching element 3, and $I_{D3}$ is the drain current of the sub-switching element 3. $I_{D0}$ is the current of the diode 5a. $I_m$ shown in dashed lines is the excitation current of the transformer 4'.

First, the period $t=t_1-t_2$ in FIG. 16 is a period during which the main switching element 2 is in the on-state, and the excitation energy is accumulated in the coil 4a of the transformer 4'. At the same time, negative voltage $V_a$ expressed in the following Equation 1 is generated in the coil 4e:

$$V_a = -\text{(double-end voltage of smoothing capacitor 11)} \times \text{(winding number of coil 4e)/(winding number of coil 4a)} \quad (1).$$

During this period, the gate-source voltage $V_{GS3}$ of the sub-switching element 3 is reversely biased to a forward voltage of the Zener diode 66, and the sub-switching element 3 is in the off-state.

Next, during the period $t=t_2-t_3$, the main switching element 2 is turned off at $t_2$ and is in the off-state during $t_2-t_3$, where the current that has flowed in the coil 4a of the transformer 4' is then transferred to the path of the body diode of the sub-switching element 3- capacitor 10- coil 4a. During this period, the voltage $V_a$ of the coil 4e is inverted from the negative to the positive. The value of the voltage $V_a$ at this moment is substantially expressed in the following Equation 2:

$$V_a = +\text{(double-end voltage of smoothing capacitor 6)} \times \text{(winding number of coil 4e)/(winding number of coil 4b)} \quad (2).$$

As a result, a gate-source capacity of the sub-switching element 3 is charged via the resistor 63, and when the voltage $V_{GS3}$ exceeds drive threshold voltage of the sub-switching element 3, the sub-switching element 3 is turned on. Moreover, the capacitor 10 absorbs the energy accumulated in the leakage inductance of the transformer 4' during the period when the drain current $I_{D3}$ of the sub-switching element 3 is negative. Thus, a surge voltage is not generated in the drain-source voltage $V_{DS2}$ of the main switching element 2.

Furthermore, the leakage inductance of the transformer 4' and the capacitor 10 resonate serially, discharging the energy absorbed by the capacitor 10 during the period when the drain current $I_{D3}$ of the sub-switching element 3 is positive to the load via the transformer 4', the diode 5a, and the smoothing capacitor 6. The time constant of the time-constant circuit made up of the resistor 61 and the capacitor 62 is set such that the transistor 65 is turned off and the sub-switching element 3 is turned off at the time when this energy is discharged completely.

During the period $t=t_3-t_4$, the transistor 65 is still in the on-state, and the sub-switching element 3 is in the off-state. During this period, the energy accumulated in the transformer 4' during the period $t_1-t_2$ is discharged to the load via the smoothing capacitor 6 to the diode 5a. The main switching element 2 is turned on at the time $t=t_4$, and the same operation is repeated thereafter.

The above-described conventional technologies have drawbacks in that, if the DC power supply voltage (voltage of the DC power supply 1 in FIG. 13 or voltage rectified by the diode bridge 50 in FIG. 15 (double-end voltage of the smoothing capacitor 11)) changes significantly, loss within the circuit increases, and the conversion efficiency of the device decreases. For example, in the conventional technology shown in FIG. 15, the AC input voltage can differ by countries, and if the double-end voltage of the smoothing capacitor 22 via the diode bridge 50 changes significantly, the value of the negative voltage generated in the coil 4e of the transformer 4' as shown in Equation 1 also changes significantly. Here, the value of the resistor 63 that charges the gate-source capacity of the sub-switching element 3 needs to be set such that the gate-source voltage exceeds the drive threshold voltage during the period in which the drain current of the sub-switching element 3 flows negatively. The set value is generally in the order of several tens through hundreds ohm ($\Omega$).

Therefore, the following problems can occur. Specifically, when the double-end voltage of the smoothing capacitor 11 is high, the current passing through the resistor 63 and the Zener diode 66 increases at the period $t=t_1-t_2$, loss generated from these parts increase, and the conversion efficiency of the device decreases. Furthermore, during the period $t=t_3-t_4$, positive voltage generated in the coil 4e of the transformer 4' is shorted by the transistor 65 via the resistor 63, generating loss in the resistor 63 and the transistor 65, and further decreasing the conversion efficiency of the device. Another problem is that, when the drain-source voltage has not reached zero when the main switching element 2 is turned on, a surge current is generated as indicated in the drain current waveform $I_{D2}$ in FIG. 16, thus increasing the noise or switching loss. The same problems can occur in the conventional technology shown in FIG. 13.

Moreover, if the voltage generated in the coil 4e changes in accordance with the DC power supply voltage, the switching frequency of each of the switching elements 2, 3 or an on-off duty ratio is changed, contributing to the increase of loss and worsening the efficiency of the device.

In addition, another problem is that in the conventional technology shown in FIG. 13, the transformer 4 includes a large number of coils. Thus, it is rather difficult to reduce the size and weight of the entire device.

Accordingly, there still remains a need to improve conventional power conversion devices. The present invention addresses this need.

SUMMARY OF THE INVENTION

The present invention relates to a power conversion device such as a switching power supply device that obtains a DC output insulated from a DC power supply.

A power conversion device includes a DC power supply, a series circuit of a main switching element and a sub-switching element sequentially connected between the positive electrode and the negative electrode of the DC power supply, an insulating transformer having a primary first coil, connected via a series circuit of a capacitor and an inductor between the positive electrode of the DC power supply and an interconnection of the main switching element and the sub-switching element, and a secondary second coil connected to a load via a rectifier smoothing circuit. It further includes a main control circuit for controlling the main switching element to turn on and off, and a sub-control circuit for controlling the sub-switching element to turn on and off.

The main control circuit and the sub-control circuit turns the main switching element and the sub-switching element on and off alternately to convert a voltage generated in the second coil and supply converted DC power via the rectifier smoothing circuit to a load.

The insulating transformer can include a primary third coil. The main control circuit turns the main switching element on and off such that a DC voltage supplied to the load becomes constant, with the voltage of the primary third coil being a signal voltage. The sub-control circuit can turn the sub-switching element on when the voltage at both ends of the sub-switching element is lower than a reference voltage. The power supply voltage of the main control circuit can be taken as a voltage obtained by subjecting the voltage generated in the primary third coil to smoothing rectification, and the power supply voltage of the sub-control circuit can be obtained by an on operation of the main switching element.

In another embodiment, which is similar to the embodiment disclosed above, the device includes a series circuit in which at least the main switching element and the sub-switching element are sequentially connected between the positive electrode and the negative electrode of the DC power supply. The primary first coil is connected via at least an inductor between the positive electrode of the DC power supply and the interconnection of the main switching element and the sub-switching element. The insulating transformer can include primary third and fourth coils. The sub-control circuit can turn the sub-switching element on during the period when the value of voltage of the primary fourth coil exceeds a predetermined value. The voltage of the primary fourth coil can be taken as signal voltage, and In yet another embodiment, the power conversion is also similar to the above embodiments, except that the sub-control circuit turns the sub-switching element on when the voltage at both ends of the sub-switching element is lower than a reference voltage.

For the above embodiments, the on period of the sub-switching element controlled by the sub-control circuit can be set to approximately half a resonance period for the capacitor and inductor. The timing when the sub-switching element is turned on by the sub-control circuit can be determined on the basis of the power supply voltage of the main control circuit supplied to the sub-control circuit. The excitation inductance of the transformer can be set large, and excitation current of the transformer can be set to not cross zero when the load is large.

BRIEF DESCRIPTION OF THE DRAWINGS

FIG. 2 is a configuration diagram of the sub-control circuit of FIG. 1.

FIG. 3 shows a frame format of a waveform of current passing through the diode 5a in the first embodiment.

DETAILED DESCRIPTION

Figure 1:
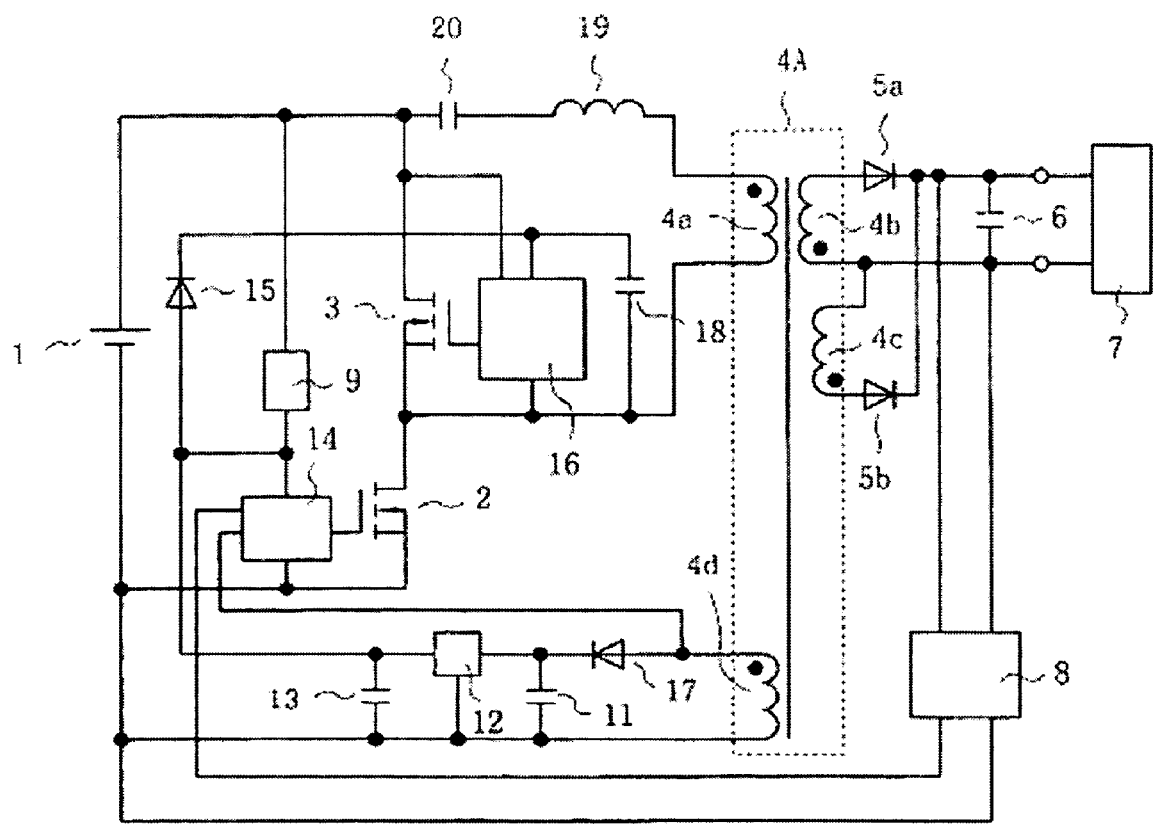
FIG. 1 shows a circuit diagram of a first embodiment of a power conversion device according to the present invention.

The same reference characters are used to identify those elements having the same functions. The overlapping explanations have been omitted accordingly, while providing the explanations for the different parts and functions.

In FIG. 1, a DC power supply 1 can be obtained, for example, by subjecting an AC power supply voltage to smoothing rectification or the like. Element 7 is a load. An insulating transformer 4A (simply called "transformer" hereinafter) has a primary first coil 4a and a primary third coil 4d, and a secondary second coil 4b and a secondary fifth coil 4c (coil 4c is a fifth coil according to the relationship thereof to a fourth coil 4e in the embodiment of FIG. 4).

A voltage lower control circuit 12 is connected to both ends of a coil 4d of the transformer 4A via a diode 17 for rectification and a smoothing capacitor 11, and its output voltage is added as a power supply voltage to a main control circuit 14 via a smoothing capacitor 13. It should be noted that the voltage lowering control circuit 12 and the capacitor 13 can be omitted as long as the voltage of the capacitor 11 does not exceed the input voltage range of the main control circuit 14 under the conditions of the entire operation of the device.

A detection value of the output voltage (voltage of a capacitor 6) of the device via a voltage detection circuit 8 is input to the main control circuit 14, and the voltage generated in the coil 4d of the transformer 4A is also input to the main control circuit 14. The main control circuit 14 is operated such that it detects inverted polarity of the voltage of the coil 4d to turn on the main switching element 2, and controls the on period of the main switching element 2 so that the output voltage becomes constant on the basis of a feed back signal from the voltage detection circuit 8.

Moreover, the device includes a starting circuit 9 for starting the main control circuit 14, and is configured by a circuit having a function for blocking starting current after starting the resistor or the main control circuit 14. An inductor 19 and a capacitor 20 are connected serially between the positive electrode of the DC power supply 1 and one end of the transformer 4A to configure a series resonance circuit. The inductor 19 can be substituted with leakage inductance of the transformer 4A. It should be noted that the inductance value of the inductor 19 is set such that a series resonance period determined by the capacitance of the capacitor 20 is larger than the on period of the sub-switching element 3.

A sub-control circuit 16 is applied with a power supply voltage via a diode 15 and a capacitor 18 through the smoothing capacitor 13. Here, the diode 15 conducts when the main switching element 2 is in the on-state, and the current passes through the path of the capacitor 13- the diode 15- the capacitor 18- the main switching element 2- the capacitor 13, to charge the capacitor 18. The voltage of the capacitor 18 supplies power supply voltage of the sub-control circuit 16.

FIG. 2 is a circuit diagram showing the configuration of the sub-control circuit 16, which has a constant current source 160, voltage dividing resistors 161, 162, reference supplies 164, 167, comparators 163, 166, a gate driver 168, and a capacitor 165. One end of the voltage dividing resistor 161 is connected to the DC power supply 1 of FIG. 1, one end of the capacitor 18 is connected to the cathode of the diode 15, and the output of the gate driver 168 is added to the gate of the sub-switching element 3.

The operation of the first embodiment follows. The main switching element 2 is turned on by the main control circuit 14, accumulating the excitation energy in the inductor 19 and the coil 4a. Before the main switching element 2 is turned off, the double-end voltage of the sub-switching element 3 becomes equal to the intermediate voltage. When the main switching element 2 is turned off, the excitation energy accumulated in the coil 4a is supplied as electrical energy to the load 7 via the coil 4b, the diode 5a, and the smoothing capacitor 6.

When the main switching element 2 is turned off, the double-end voltage of the sub-switching element 3 becomes half the intermediate voltage. If the voltage of the reference supply 164 of the comparator 163 inside the sub-control circuit 16 is set to the intermediate value between the above-mentioned intermediate voltage and the half-voltage of the intermediate voltage, and the reference voltage is compared to a voltage dividing value obtained by the voltage dividing resistors 161, 162 to obtain an output of the comparator 163, the output of the comparator 163 is placed at a low level when the main switching element 2 is off. The capacitor 165 of the sub-control circuit 16 is discharged when the output of the comparator 163 is at the low level, and is charged by the constant current source 160 when the output of the comparator 163 is at a high level. During the period when the voltage of the capacitor 165 does not reach the voltage of the reference supply 167, the output of the comparator 166 is at the high level, and the sub-switching element 3 is turned on via the gate driver 168 (the double-end voltage of the sub-switching element 3 is reduced to a voltage determined by on resistance of the sub-switching element 3). Accordingly, the excitation energy accumulated in the inductor 19 is absorbed by the capacitor 20, so that a surge voltage is not generated in the drain-source voltage of the main switching element 2. Moreover, the inductor 19 and the capacitor 20 resonate serially, and the energy accumulated in the capacitor 20 is supplied to the load 7 via the transformer 4A, the diodes 5a, 5b, and the smoothing capacitor 6. When the voltage of the capacitor 165 reaches the reference voltage, the output of the comparator 166 is placed at the low level, and the sub-switching element 3 is turned off via the gate driver 168. Further, when the sub-switching element 3 is turned off, the voltage in the positive direction is generated in the coil 4d of the transformer 4A, and the main switching element 2 is turned on by the main control circuit 14. The main switching element 2 is turned off after a lapse of time, which is calculated by PWM control of the main control circuit 14.

In the first embodiment, by carrying out the power conversion operation while repeating the above-described operations, the waveform of the current passing through the diode 5a becomes as shown in FIG. 3. When the on period of the sub-switching element 3, which is determined by the voltage of the capacitor 165 inside the sub-control circuit 16 and the voltage of the reference supply 167 of the comparator 166, is set to be half the resonance period of the capacitor 20 and the inductor 19, the duty of the output current waveform is operated in the manner shown in FIG. 3.

Moreover, regardless of the load exceeding the load power $P_0$ shown in the following Equation 3 (determined based on intermediate voltage $E_d$, capacitance $C_r$ of the capacitor 20, and an inductance value $L_r$ of the inductor 19), or the DC input voltage of the device, the switching frequency and duty can perform constant control:

$$P_0 = (E_d^2/2\pi) \cdot \sqrt{(C_r/L_r)} \qquad (3)$$

It should be noted that if the switching period of the sub-switching element 3 is set regardless of the resonance period, the same operation as the conventional device can be performed. In the first embodiment, one end of the voltage dividing resistor 161 inside the sub-control circuit 16 is connected to the positive electrode of the DC power supply 1. However, additional diode (not shown) can be connected to the diode 15 of FIG. 1 in the forward direction, and the cathode of the diode 15 can be connected to the end of the voltage dividing resistor 161 of FIG. 2, thereby detecting the timing for turning the sub-switching element 3 on from the power supply voltage of the main control circuit 14 via diode.

Figure 4:
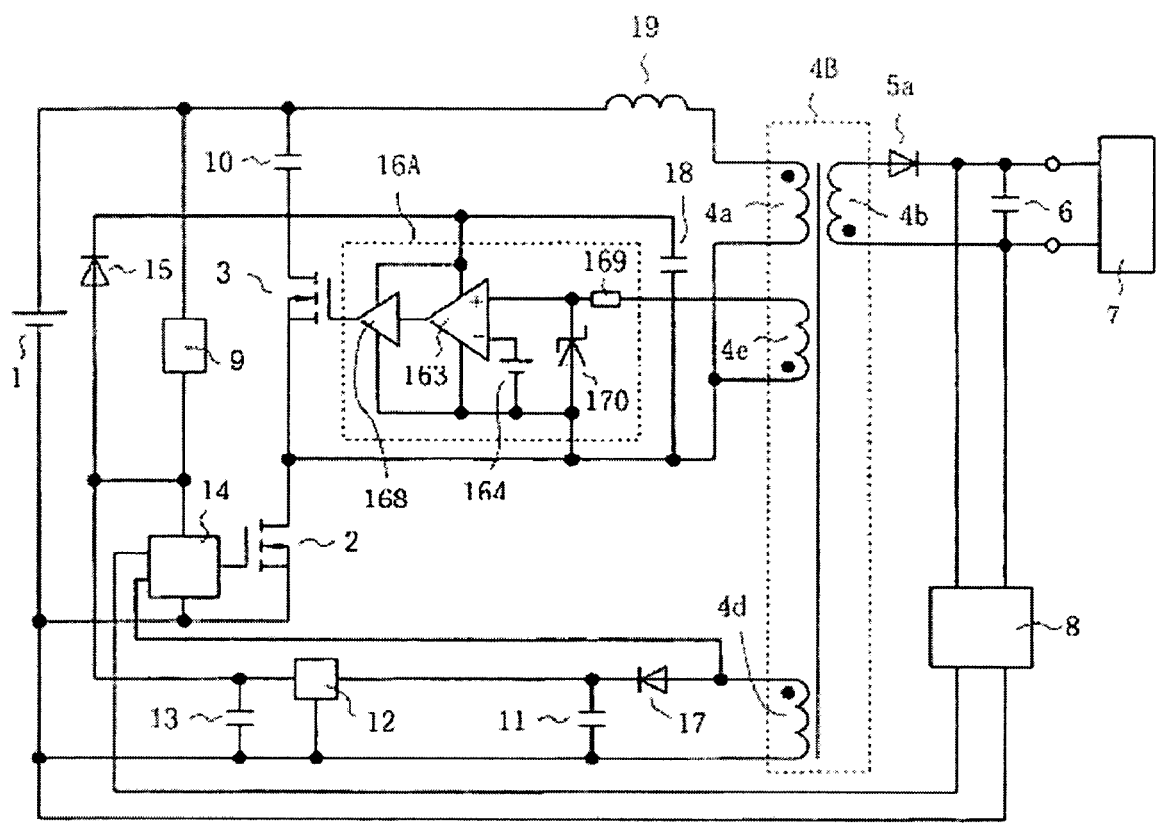
FIG. 4 shows a circuit diagram of a second embodiment of a power conversion device according to the present invention.

FIG. 4 is a configuration diagram of a circuit of the second embodiment. Same reference characters are used to indicate the same functions in FIG. 1, thus the overlapping explanations are omitted accordingly, and the explanations for the different parts are provided hereinafter. The transformer 4B has primary first, third, and fourth coils 4a, 4d, and 4e, and a secondary second coil 4b. A current limiting resistor 169 and a Zener diode 170 in a sub-control circuit 16A are serially connected to both ends of the coil 4e. The cathode of the Zener diode 170 is connected to the positive input terminal of the comparator 163, and the anode of the same is connected the negative input terminal of the comparator 163 via the reference supply 164. Furthermore, an output terminal of the comparator 163 is connected to the gate of the sub-switching element 3 via the gate driver 168.

In the sub-control circuit 16A described above, the voltage of the coil 4e of the transformer 4B is compared to the voltage of the reference supply 164 by the comparator 163, and the sub-switching element 3 is driven by the gate driver 168. The period in which the voltage of the coil 4e exceeds the reference supply is taken as the on period of the sub-switching element 3. The Zener diode 170 is to limit positive and negative voltage generated in the coil 4e so that they do not exceed the allowance input voltage of the comparator 163.

Moreover, as in the first embodiment, the diode 15 conducts when the main switching element 2 is in the on-state, and the current passes through the path of the capacitor 13- the diode 15- the capacitor 18- the main switching element 2- the capacitor 13, to charge the capacitor 18. The voltage of the capacitor 18 supplies the power supply voltage of the sub-control circuit 16A. Specifically, the power supply voltage of the sub-control circuit 16A becomes substantially equal to the power supply voltage of the main control circuit 14.

Figure 5:
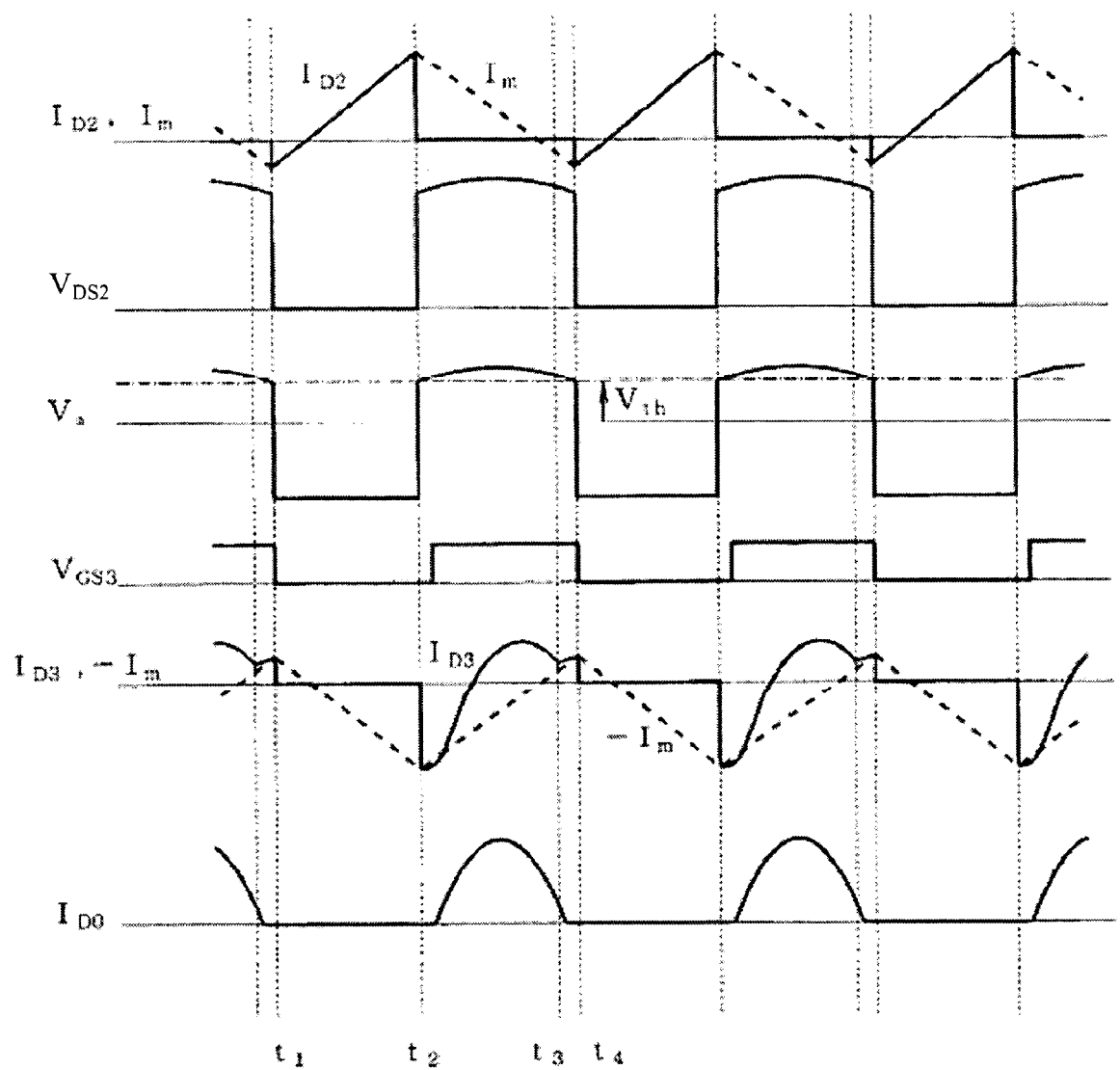
FIG. 5 is a waveform diagram showing an operation of the second embodiment.

The operation of the second embodiment follows with reference to the waveform diagram of FIG. 5. The period $t=t_1-t_2$ is a period during which the main switching element 2 is in the on-state, and the excitation energy is accumulated in the inductor 19 and the coil 4a of the transformer 4B. At the same time, a negative voltage $V_a$ is generated in the coil 4e. The voltage of the positive input terminal of the comparator 163 inside the sub-control circuit 16A is lower than the voltage of the reference supply 164 since the voltage of the Zener diode 170 becomes the forward voltage, thus placing an output of the Zener diode 170 at a low level. For this reason, the output of the gate driver 168 is at a low level, and the sub-switching element 3 is in the off-state.

Next, during the period $t=t_2-t_3$, the main switching element 2 is turned off at $t_2$ and is in the off-state during $t_2-t_3$, where the current that has flowed in the coil 4a of the transformer 4' is then transferred to the path of the body diode of the sub-switching element 3- the capacitor 10- the coil 4a. Moreover, the voltage $V_a$ of the coil 4e is inverted from the negative to the positive. If this voltage $V_a$ exceeds the voltage (drive threshold) $V_{th}$ of the reference supply 164, the output of the gate driver 168 is placed at a high level, and the sub-switching element 3 is turned on.

Furthermore, the energy accumulated in the inductor 19 is absorbed by the capacitor 10. Thus, a surge voltage is not generated in the drain-source voltage $V_{DS2}$ of the main switching element 2. Further, the inductor 19 and the capacitor 10 resonate serially, discharging the energy absorbed by the capacitor 10 to the load 7 via the coils 4a and 4b of the transformer 4B, the diode 5a, and the smoothing capacitor 6.

Incidentally, the drain-source voltage of the main switching element 2 is obtained by adding the voltage of the DC power supply 1 to the voltage of the capacitor 10, and the inductor 19 having an inductance value relatively larger than the leakage inductance value of the transformer 4B is connected thereto. Thus, the double-voltage of the capacitor 10 pulsates sinusoidally, and turns into the form of a vault. The same is applied to the positive voltage $V_a$ generated in the coil 4e, as shown in FIG. 5.

After the energy absorbed by the capacitor 10 is completely discharged, the current $I_{D0}$ passing through the diode 5a becomes zero, and the diode 5a is turned off. During the period $t=t_3-t_4$, the excitation current $I_m$ is inverted to negative, and passes through the path of the coil 4a- the inductor 19- the capacitor 10- the sub-switching element 3- the coil 4a. If the voltage $V_a$ of the coil 4e becomes lower than the drive threshold $V_{th}$, outputs of the comparator 163 and the gate driver 168 are placed at a low level, and the sub-switching element 3 is turned off. The drain-source voltage of the sub-switching element 3 rises, and at the same time, the drain-source voltage of the main switching element 2 decreases. When the drain-source voltage of the main switching element becomes zero, the body diode of the main switching element 2 conducts, and the excitation current $I_m$ is transferred to the path of the coil 4a-the inductor 19- the DC power supply 1- the main switching element 2- the coil 4a. When the main switching element 2 is turned on at this timing, zero voltage switching is obtained, and a surge current does not pass through the main switching element 2, realizing switching with low noise. Thereafter, the above-mentioned operations from $t_1$ through $t_4$ are repeated.

It should be noted that in the circuit shown in FIG. 4 the sub-switching element 3 is not directly driven by the coil 4e, but is indirectly driven after detecting the voltage $V_a$ of the coil 4e as signal voltage. Moreover, drive voltage of the sub-control circuit 16A is substantially equal to the stabilized power supply voltage of the main control circuit 14. A value of resistance of the current limiting resistor 169 is in the order of several k through several hundreds k ohm. Therefore, even if the voltage of the DC power supply 1 is changed significantly, the power consumptions of the resistor 169 and the Zener diode 170 are small, and can prevent the efficiency of the device from being reduced. Moreover, the main switching element 2 performs the zero voltage switching operation as described above. Thus, a surge current does not pass therethrough, and a device with low noise can be provided.

Figure 15:
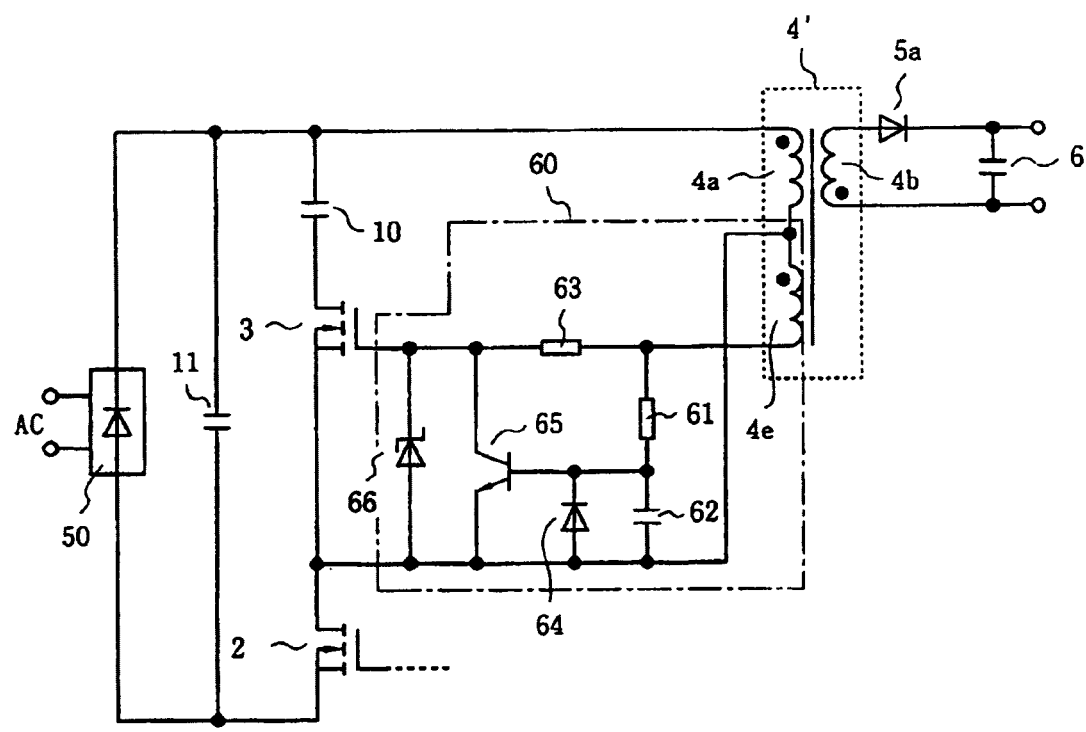
FIG. 15 shows a circuit diagram of another conventional power conversion device.
Figure 16:
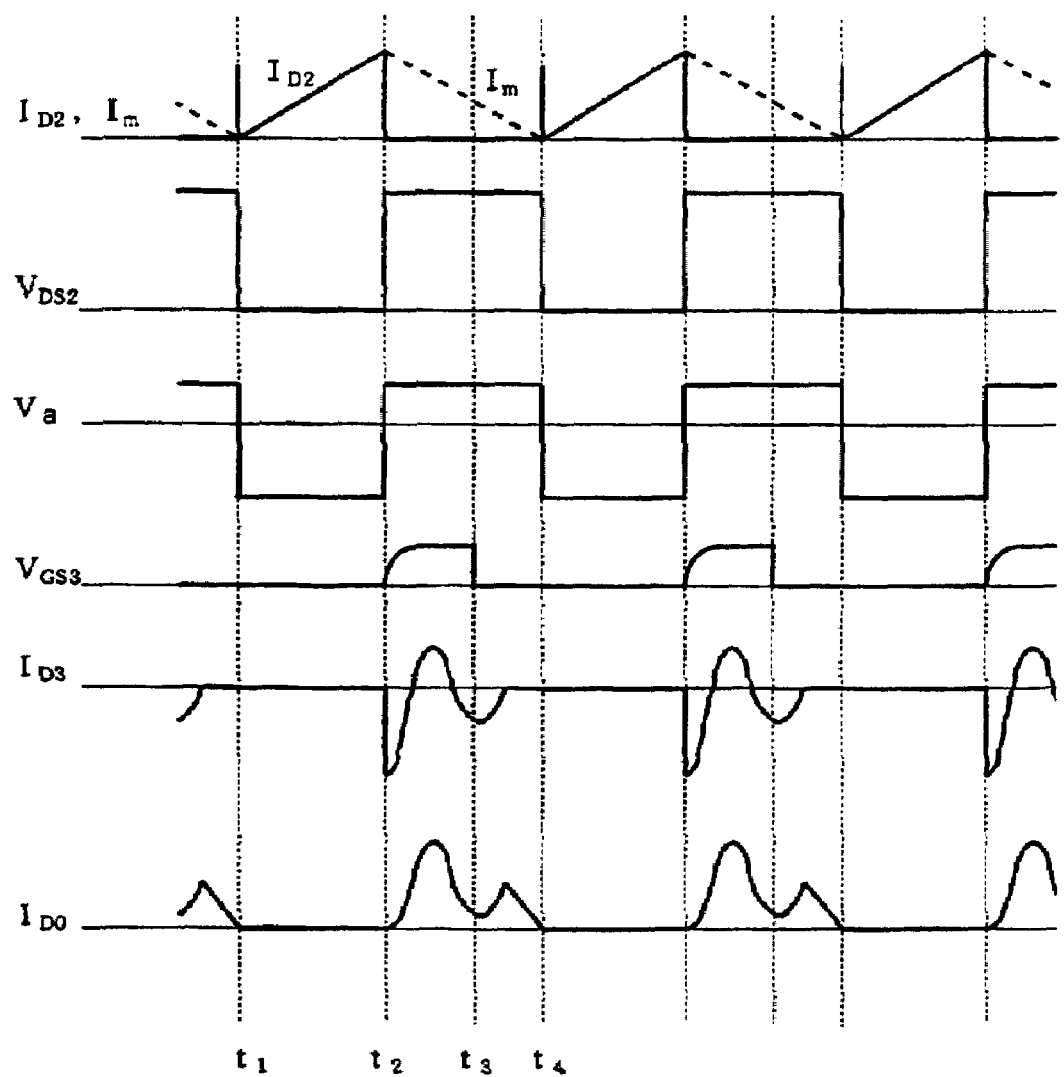
FIG. 16 is a waveform diagram showing the operation of FIG. 15.

In the conventional technology shown in FIG. 15, the sub-switching element 3 is directly driven by the voltage of the coil 4e. Thus, the level of the voltage generated in the coil 4e needs to be set to at lease 10V, where the value of on-resistance of the sub-switching element 3 is saturated substantially. However, in the present embodiment, such a value can be lower since the voltage of the coil 4e is used as the signal voltage. As a result, the winding numbers of the coil 4e can be reduced to miniaturize the transformer 4B.

Furthermore, the drive threshold $V_{th}$ of the comparator 163 can be adjusted to adjust the on period of the sub-switching element 3. Accordingly, the switching frequency and the drain-source voltage peak value of the sub-switching element 3, the drain current peak value, and the RMS of the drain current of each of the switching elements 2 and 3 can be adjusted. Therefore, the present device has an advantage in that conditions where the highest efficiency is obtained can be set easily.

Figure 6:
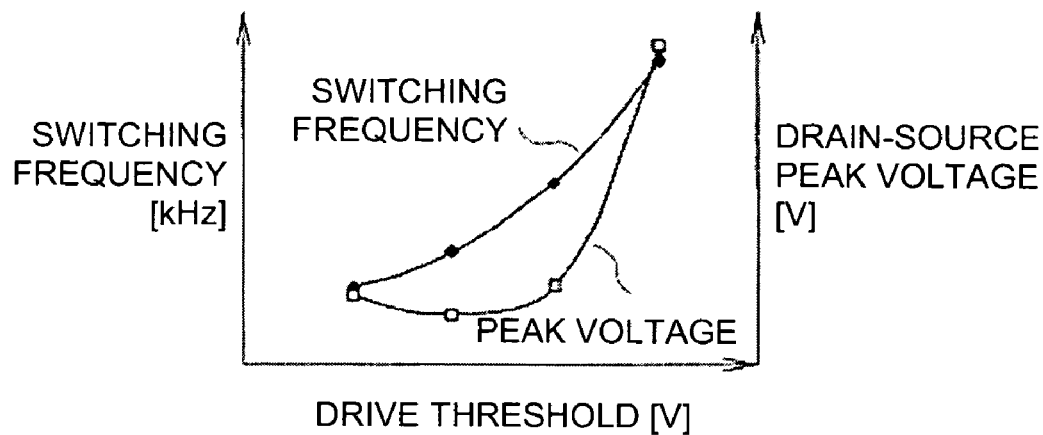
FIG. 6 shows the relationship of a drive threshold to the switching frequency and the drain-source peak voltage of the sub-switching element in the second embodiment.
Figure 7:
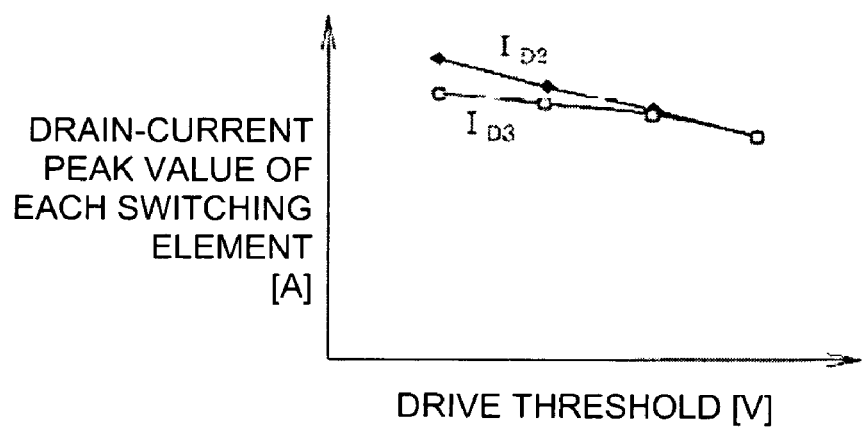
FIG. 7 shows the relationship of the drive threshold to a peak value of the drain current of each switching element in the second embodiment.
Figure 8:
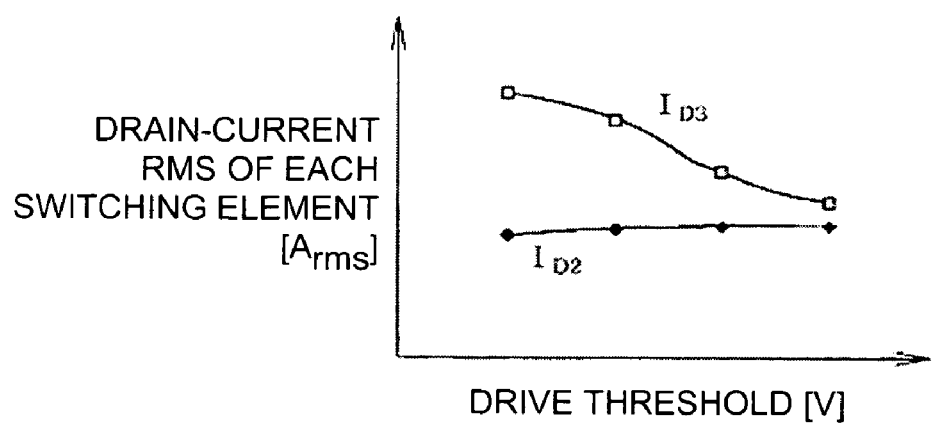
FIG. 8 shows the relationship of the drive threshold to the RMS of the drain current of each switching element in the second embodiment.

FIG. 6 shows the relationship of the drive threshold $V_{th}$ to the switching frequency and the drain-source peak voltage of the sub-switching element 3, when adjusting the drive threshold $V_{th}$. Moreover, FIG. 7 shows the relationship of the drive threshold $V_{th}$ to peak values of the drain current $I_{D2}$, $I_{D3}$ of each switching element 2, 3. FIG. 8 shows the relationship of the drive threshold $V_{th}$ to the RMS of the drain current $I_{D2}$, $I_D3$ of each switching element 2, 3.

Figure 9:
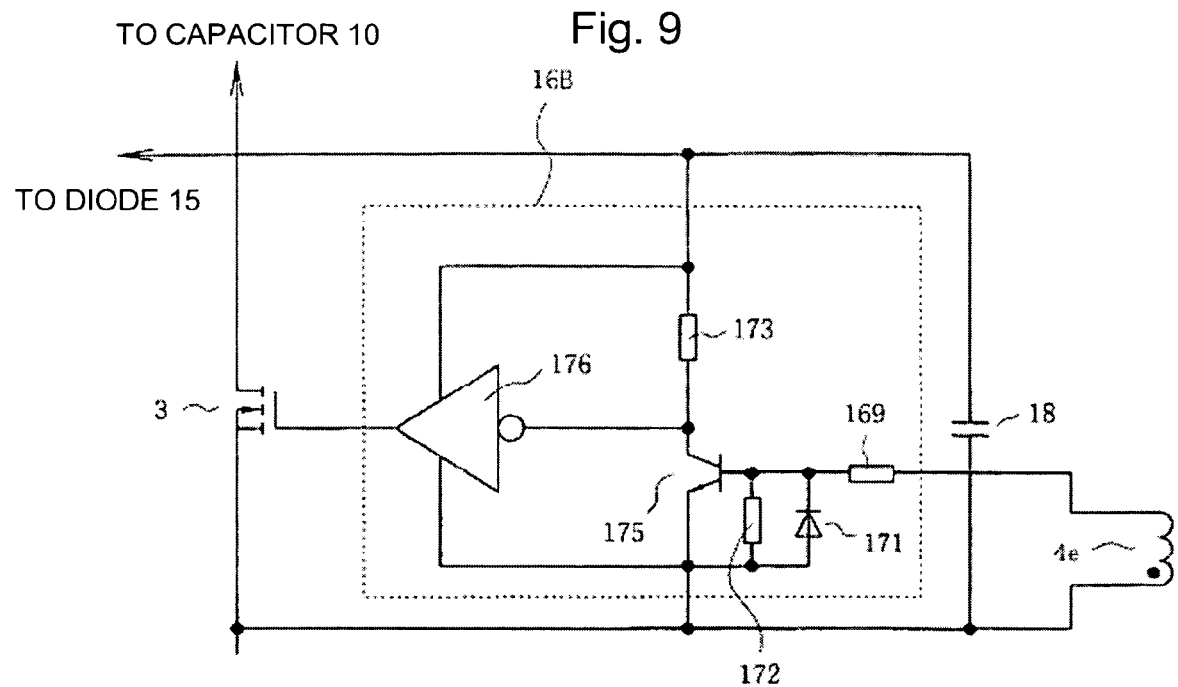
FIG. 9 shows a circuit diagram of a principal part of a third embodiment of a power conversion device according to the present invention.

FIG. 9 is a circuit diagram showing a principal part of a third embodiment, which is a modified example of the sub-control circuit in the second embodiment described above. In FIG. 9, 16B is a sub-control circuit, 169, 172 and 173 are resistors, 171 is a diode, 175 is an NPN transistor, and 176 is a negative logic gate driver. When the voltage obtained by dividing the voltage of an auxiliary coil 4e by the resistors 169 and 172 exceeds the base-emitter saturation voltage of the transistor 175, the sub-switching element 3 is turned on by the negative logic gate driver 176.

Figure 10:
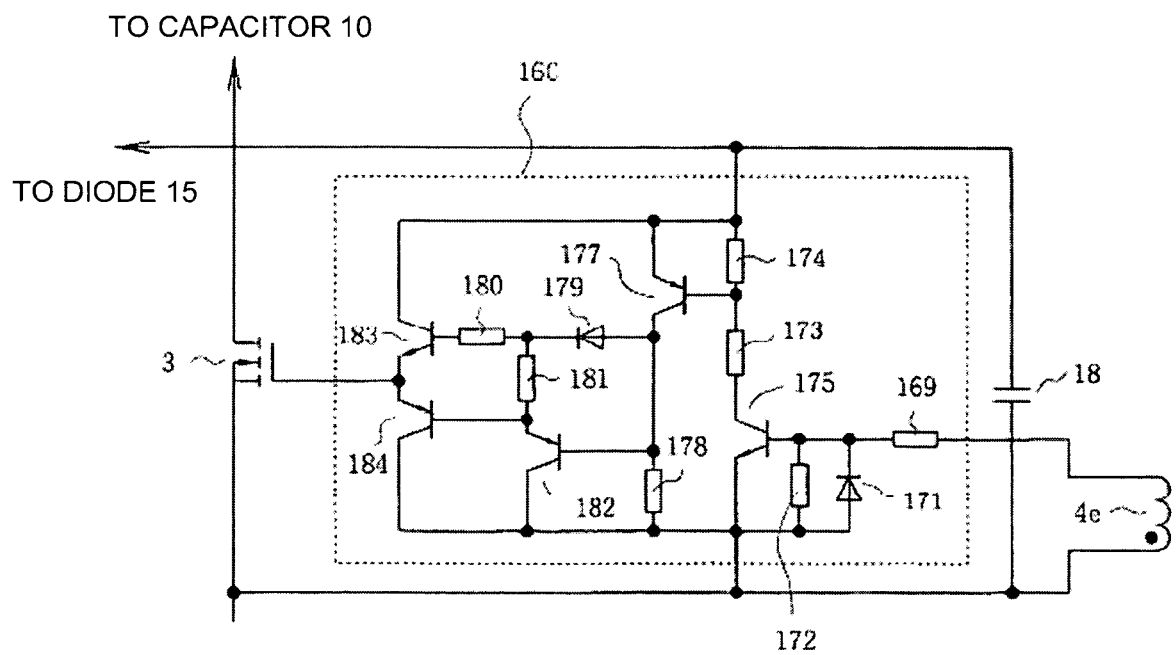
FIG. 10 shows a circuit diagram of a principal part of a fourth embodiment of a power conversion device according to the present invention.

FIG. 10 is a circuit diagram showing a principal part of a fourth embodiment, which provides an example in which the negative logic gate driver 176 in the sub-control circuit 16B of the third embodiment is configured by alternate components. Specifically, the negative logic driver includes a sub-control circuit 16C, resistors 174, 178, 180, and 181, a diode 179, PNP transistors 177, 182, 183, and 184.

Figure 11:
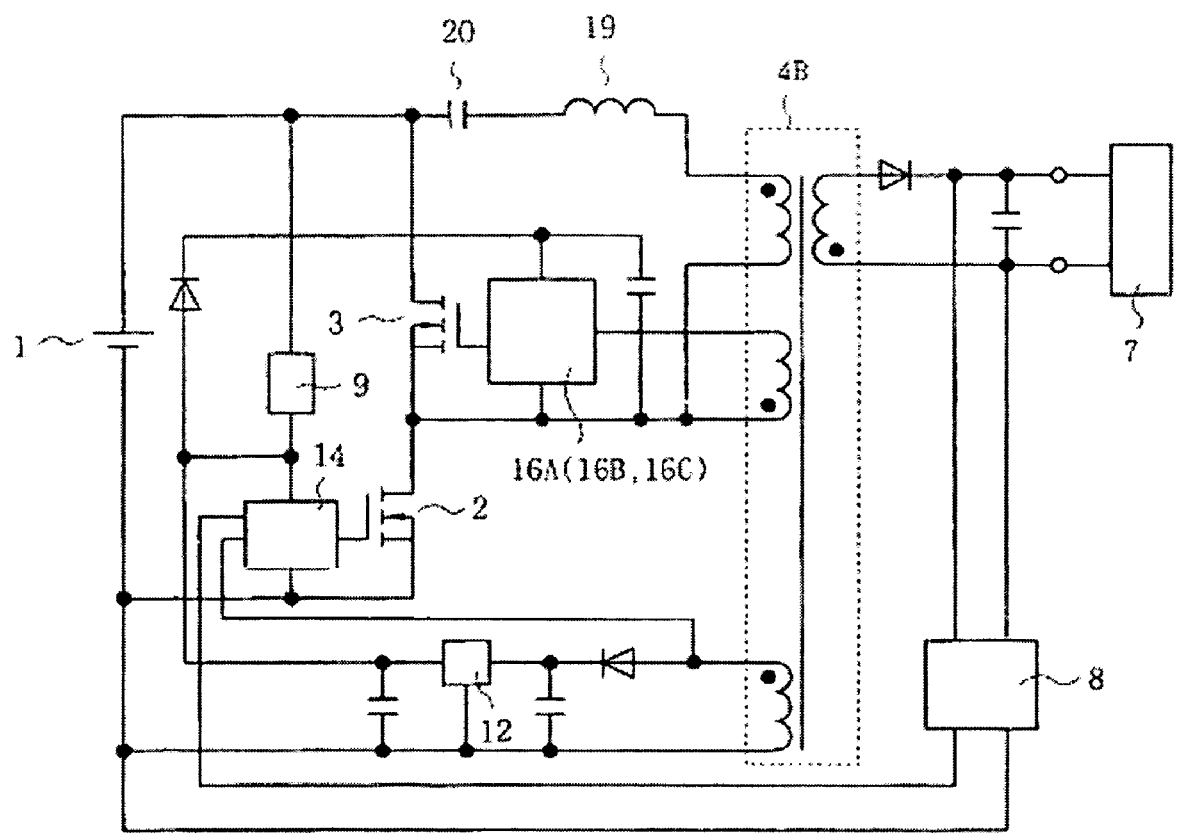
FIG. 11 shows a circuit diagram of a fifth embodiment of a power conversion device according to the present invention.

FIG. 11 is a circuit diagram showing a fifth embodiment, which is similar to the second embodiment, except that, instead of the capacitor 10, the capacitor 20 is connected between the positive electrode of the DC power supply 1 and the inductor 19, as in the first embodiment. Operation of this embodiment is the same as that of the second embodiment. It should be noted that the sub-switching element 3 can be driven by the sub-control circuit 16A, 16B, or 16C described above.

Figure 12:
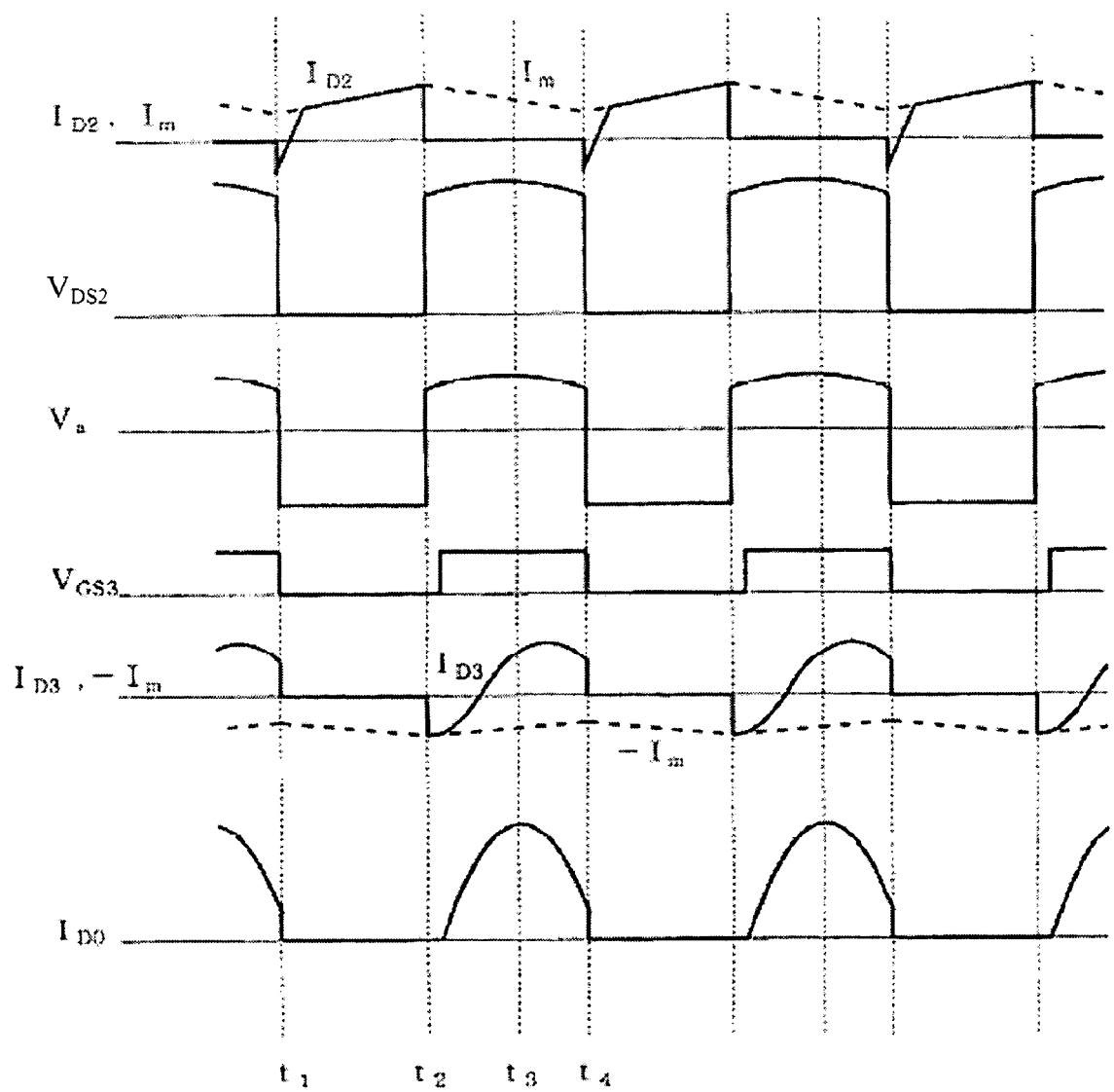
FIG. 12 is a waveform diagram showing an operation of a sixth embodiment of a power conversion device according to the present invention.
Figure 13:
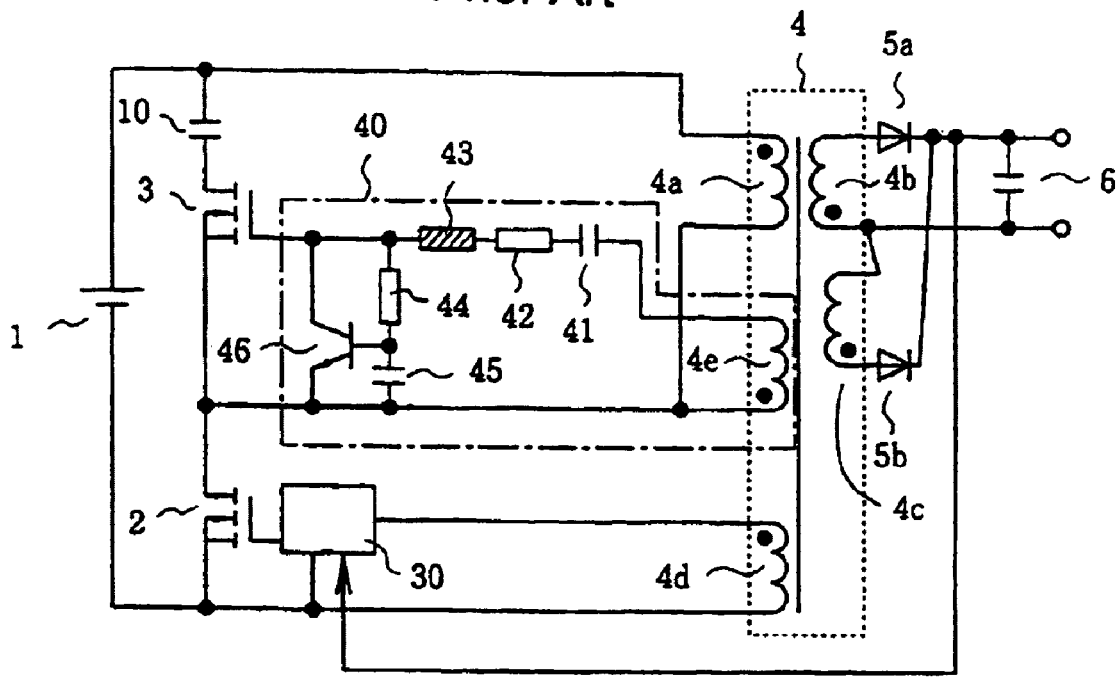
FIG. 13 shows a circuit diagram of a conventional power conversion device.
Figure 14:
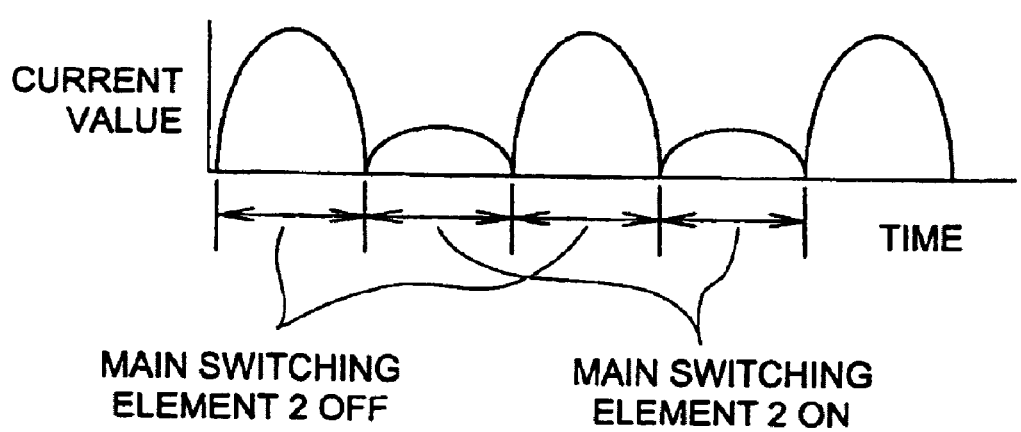
FIG. 14 shows a frame format of a waveform of current passing through the diode 5a in FIG. 13.

FIG. 12 is a waveform diagram showing an operation of a sixth embodiment. Here, the excitation inductance value of the transformer 4B is set relatively larger so that the excitation current $I_m$ continues to flow positively, and does not cross zero when the load is large, as shown in FIG. 5. Specifically, the difference with the waveform of the operation shown in FIG. 5 is that the device is operated such that the sub-switching element 3 is turned off before the current $I_{D0}$ passing through the diode 5a becomes zero.

The operation shown in FIG. 12 is the same as the operation in which the conventional flyback converter is operated in a continuous mode. The advantage of such operation is that the peak value of the drain current and the current RMS of the main switching element 2 and the RMS of the current passing through the diode 5a are reduced, and the loss in the main switching element 2 and the loss in the diode 5a can be reduced so that the conversion efficiency of the device can be further improved.

Although not shown in the figures, it should be noted in the embodiments shown in FIG. 4 and FIG. 11, the sub-control circuit 16 in the embodiment of FIG. 1 and FIG. 2 can be used instead of the sub-control circuit 16A, 16B, 16C, and the primary fourth coil 4e of the insulating transformer can be eliminated. Accordingly, the structure of the transformer can be further simplified.

The present device can provide low losses and high efficiency for a wide range of DC input voltages, and can reduce noise, size, and weight. Specifically, the coil voltage of the insulating transformer need not be used to drive the sub-switching element. Thus, the number of coils in the transformer can be reduced, thereby contributing to reduction in size and weight of the device and the cost. Moreover, as the switching frequency and duty ratio can be made constant regardless of the change in the DC input voltage, a voltage conversion device having high conversion efficiency can be realized.

The coil voltage of the insulating transformer can be detected as a signal. The sub-control circuit indirectly drives the sub-switching element with this signal. The power supply voltage of the sub-control circuit is created from a stabilized power supply on the main control circuit side so that the loss related to the drive of the switching element can be reduced in comparison with the conventional technologies, and the conversion efficiency of the device can be improved.

Moreover, if the series resonance period for the inductor connected serially to the primary coil of the insulating transformer and the capacitor connected to the positive electrode of the DC power supply is made longer than the "on" period of a high potential switching element (sub-switching element), zero-voltage switching of a low potential switching element (main switching element) can be performed, and a power conversion device with reduced surge current and noise can be provided.

While the present invention has been particularly shown and described with reference to particular embodiments, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, Japanese Application No. 2004-310791, filed on 26 Oct. 2004. The disclosure of the priority application, in its entirety, including the drawings, claims, and the specification thereof, is incorporated herein by reference.

What is claimed is:

1. A power conversion device comprising:
a DC power supply;
a series circuit of a main switching element and a sub-switching element sequentially connected between the positive electrode and the negative electrode of the DC power supply;
an insulating transformer having a primary first coil connected via a series circuit of a capacitor and an inductor between the positive electrode of the DC power supply and an interconnection of the main switching element and the sub-switching element, and a secondary second coil connected to a load via a rectifier smoothing circuit;
a main control circuit for controlling the main switching element to turn on and off; and
a sub-control circuit for controlling the sub-switching element to turn on and off,
wherein the main control circuit and the sub-control circuit turns the main switching element and the sub-switching element on and off alternately to convert a voltage generated in the second coil and supply converted DC power via the rectifier smoothing circuit to a load,
wherein the insulating transformer includes a primary third coil,
wherein the main control circuit turns the main switching element on and off such that a DC voltage supplied to the load becomes constant, with the voltage of the primary third coil being a signal voltage,
wherein the sub-control circuit turns the sub-switching element on when a voltage at both ends of the sub-switching element is lower than a reference voltage, and
wherein a power supply voltage of the main control circuit is taken as a voltage obtained by subjecting a voltage generated in the primary third coil to smoothing rectification, and a power supply voltage of the sub-control circuit is obtained by an on operation of the main switching element.

2. The power conversion device according to claim 1, wherein an on period of the sub-switching element controlled by the sub-control circuit is set to approximately half a resonance period for the capacitor and inductor.

3. The power conversion device according to claim 1, wherein the timing when the sub-switching element is turned on by the sub-control circuit is determined on the basis of the power supply voltage of the main control circuit supplied to the sub-control circuit.

4. The power conversion device according to claim 2, wherein the timing when the sub-switching element is turned on by the sub-control circuit is determined on the basis of the power supply voltage of the main control circuit supplied to the sub-control circuit.

5. The power conversion device according to claim 1, wherein the excitation inductance of the transformer is set large, and excitation current of the transformer is set to not cross zero when the load is large.

6. The power conversion device according to claim 2, wherein the excitation inductance of the transformer is set large, and excitation current of the transformer is set to not cross zero when the load is large.

7. The power conversion device according to claim 3, wherein the excitation inductance of the transformer is set large, and excitation current of the transformer is set to not cross zero when the load is large.

8. The power conversion device according to claim 4, wherein the excitation inductance of the transformer is set large, and excitation current of the transformer is set to not cross zero when the load is large.

9. A power conversion device comprising:
a DC power supply;
a series circuit in which at least a main switching element and a sub-switching element are sequentially connected between the positive electrode and the negative electrode of the DC power supply;
an insulating transformer having a primary first coil, connected via at least an inductor between the positive electrode of the DC power supply and an interconnection of the main switching element and the sub-switching element, and a secondary second coil connected to a load via a rectifier smoothing circuit;
a main control circuit for controlling the main switching element to turn on and off; and
a sub-control circuit for controlling the sub-switching element to turn on and off,
wherein the main control circuit and the sub-control circuit turns the main switching element and the sub-switching element on and off alternately to convert a voltage generated in the second coil and supply converted DC power via the rectifier smoothing circuit to the load,
wherein the insulating transformer includes primary third and fourth coils,
wherein the main control circuit turns the main switching element on and off such that a DC voltage supplied to the load becomes constant, with the voltage of the third primary coil being a signal voltage,
wherein the sub-control circuit turns the sub-switching element on during a period when a value of voltage of the primary fourth coil exceeds a predetermined value, the voltage of the primary fourth coil being taken as signal voltage, and wherein a power supply voltage of the main control circuit is taken as a voltage obtained by subjecting voltage generated in the primary third coil to smoothing rectification, and a power supply voltage of the sub-control circuit is obtained by an on operation of the main switching element.

10. The power conversion device according to claim 9, wherein excitation inductance of the transformer is set large, and excitation current of the transformer is set to not cross zero when the load is large.

11. A power conversion device comprising:

a DC power supply;

a series circuit in which at least a main switching element and a sub-switching element are sequentially connected between the positive electrode and the negative electrode of the DC power supply;

an insulating transformer having a primary first coil connected via at least an inductor between the positive electrode of the DC power supply and an interconnection of the main switching element and the sub-switching element, and a secondary second coil connected to a load via a rectifier smoothing circuit;

a main control circuit for controlling the main switching element to turn on and off; and a sub-control circuit for controlling the sub-switching element to turn on and off, wherein the main control circuit and the sub-control circuit turns the main switching element and the sub-switching element on and off alternately to convert a voltage generated in the second coil and supply converted DC power via the rectifier smoothing circuit to the load, wherein the insulating transformer includes a primary third coil, wherein the main control circuit turns the main switching element on and off such that a DC voltage supplied to the load becomes constant, with the voltage of the primary third coil being a signal voltage, wherein the sub-control circuit turns the sub-switching element on when a voltage at both ends of the sub-switching element is lower than a reference voltage, and wherein a power supply voltage of the main control circuit is taken as voltage obtained by subjecting a voltage generated in the primary third coil to smoothing rectification, and a power supply voltage of the sub-control circuit is obtained by an on operation of the main switching element.

12. The power conversion device according to claim 11, wherein excitation inductance of the transformer is set large, and excitation current of the transformer is set to not cross zero when the load is large.

* * * * *